United States Patent
Smolarz

(10) Patent No.: US 12,413,917 B2
(45) Date of Patent: Sep. 9, 2025

(54) WIRELESS AUDIO TRANSMITTER AND RECEIVER BONE DEVICE USING BONE CONDUCTION

(71) Applicant: Luzidy, LLC, Sheridan, WY (US)

(72) Inventor: Joseph Ryan Smolarz, Charlotte Amalie (VG)

(73) Assignee: Luzidy, LLC, Sheridan, WY (US)

( * ) Notice: Subject to any disclaimer, the term of this patent is extended or adjusted under 35 U.S.C. 154(b) by 288 days.

(21) Appl. No.: 17/790,676

(22) PCT Filed: Jan. 4, 2021

(86) PCT No.: PCT/US2021/012045
§ 371 (c)(1),
(2) Date: Jul. 1, 2022

(87) PCT Pub. No.: WO2021/138655
PCT Pub. Date: Jul. 8, 2021

(65) Prior Publication Data
US 2023/0037831 A1    Feb. 9, 2023

Related U.S. Application Data

(60) Provisional application No. 62/956,914, filed on Jan. 3, 2020.

(51) Int. Cl.
*H04R 25/00* (2006.01)
*A61C 7/08* (2006.01)

(52) U.S. Cl.
CPC .............. *H04R 25/606* (2013.01); *A61C 7/08* (2013.01); *H04R 25/554* (2013.01); *H04R 2460/13* (2013.01)

(58) Field of Classification Search
CPC ................ H04R 1/46; H04R 2201/107; H04R 2460/13; H04R 25/554; H04R 25/606; A61C 7/08
(Continued)

(56) References Cited

U.S. PATENT DOCUMENTS

| | | | | |
|---|---|---|---|---|
| 2,161,169 | A | * 6/1939 | Jefferis, Jr. | .......... H04R 25/606 340/407.1 |
| 2,242,118 | A | * 5/1941 | Fischer | .................... H04R 1/46 381/151 |

(Continued)

FOREIGN PATENT DOCUMENTS

| EP | 2191663 B1 | 11/2014 |
|---|---|---|
| WO | 2007/140367 | 12/2007 |

(Continued)

OTHER PUBLICATIONS

PCT International Search Report for PCT/US2021/012045, mailed Mar. 26, 2021.

*Primary Examiner* — Phylesha Dabney
(74) *Attorney, Agent, or Firm* — McBee Moore & Vanik, IP, LLC

(57) ABSTRACT

The disclosure is directed to methods for transmitting vibrations via an electronic and/or transducer assembly through a user or wearer's tooth, teeth, jaw, and/or other bones. The disclosure is further directed to a system for transmitting vibrations via an electronic and/or transducer assembly through a user or wearer's tooth, teeth, jaw and/or other bones. The disclosure is further directed to an oral apparatus for implementation of methods and systems described herein.

20 Claims, 16 Drawing Sheets

(58) Field of Classification Search
USPC .......................................................... 381/326
See application file for complete search history.

(56) References Cited

U.S. PATENT DOCUMENTS

| | | | |
|---|---|---|---|
| 5,088,927 A * | 2/1992 | Lee .......................... | A61K 6/58 433/201.1 |
| 6,702,575 B2 | 3/2004 | Hilliard | |
| 8,712,078 B2 | 4/2014 | Abolfathi | |
| 2003/0190575 A1 | 10/2003 | Hilliard | |
| 2010/0006111 A1 | 1/2010 | Spiridigliozzi et al. | |
| 2013/0034238 A1 | 2/2013 | Abolfathi | |
| 2018/0116762 A1 | 5/2018 | Kopelman | |
| 2019/0364373 A1 | 11/2019 | Abolfathi et al. | |
| 2019/0374309 A1 | 12/2019 | Parkar et al. | |

FOREIGN PATENT DOCUMENTS

| | | | | |
|---|---|---|---|---|
| WO | WO-2009111566 A1 * | 9/2009 | ............... | A61F 11/04 |
| WO | WO2010085455 A1 | 7/2010 | | |
| WO | WO-2016007085 A1 * | 1/2016 | ............... | A61C 7/08 |
| WO | 2019055544 A1 | 3/2019 | | |

* cited by examiner

WIRELESS AUDIO TRANSMITTER AND RECEIVER BONE DEVICE USING BONE CONDUCTION

CROSS-REFERENCE TO RELATED APPLICATIONS

This application is the National Stage entry of International Application No. PCT/US2021/012045, filed 4 Jan. 2021, which claims priority to U.S. Application No. 62/956,914, filed 3 Jan. 2020.

FIELD

The disclosure is directed to methods for transmitting vibrations via an electronic and/or transducer assembly through a user or wearer's tooth, teeth, jaw, and/or other bones. The disclosure is further directed to a system for transmitting vibrations via an electronic and/or transducer assembly through a user or wearer's tooth, teeth, jaw and/or other bones. The disclosure is further directed to an oral apparatus for implementation of methods and systems described herein.

BACKGROUND

There is an ongoing need to develop means of aiding or otherwise assisting the hearing in individuals who suffer from partial or even complete hearing loss in one or both ears.

The eardrum is extremely sensitive and listening to loud sounds—especially for extended periods of time—can damage one's eardrums. This sort of damage to the eardrum is a primary source of hearing loss. Eardrum damage is cumulative and more likely to occur with old age.

When soundwaves reach the eardrum, the eardrums in turn vibrate, decoding sound waves into a different type of vibrations that are received by the cochlea, also known as the inner ear. The cochlea is connected to the auditory nerve, which transmits the sounds to the brain.

Bone conduction of sound bypasses the eardrums. In bone conduction, vibrations can be received directly by the cochlea, thereby excluding the eardrum from the entire process of receiving audio.

Some hearing aids employ bone conduction technology to achieve an effect equivalent or comparable to hearing directly, i.e., without the assistance of a device, by means of the ear(s).

For example, a headset may be ergonomically positioned on a person's temple and cheek and an electromechanical transducer converts electric signals into mechanical vibrations, resulting in sound waves being sent to the inner ear through the user's cranial bones.

One long-term solution, which relies on bone conduction, is the bone-anchored hearing aid.

Malformations of the ear canal or middle ear, such as narrowing of the ear canal or a malformed or absent pinna (i.e., external ear) cause conductive hearing loss. These malformations are often congenital. A bone-anchored hearing solution delivers sound vibrations directly to the inner ear by being in direct contact with the skull bones.

Bone-anchored hearing aids use a surgically implanted abutment to transmit sound waves via direct conduction through a patient's cranial bones to his or her inner ear, thereby bypassing the external auditory canal and middle ear.

When the implant vibrates the surrounding bone, which transmits sound waves in the inner ear that stimulate the hair cells and result in the firing of the auditory nerve.

In general, a titanium implant prosthesis is surgically embedded into the patient's skull with a small abutment exposed outside of the patient's skin. A sound processor sits on, or is otherwise affixed to, this abutment.

The sound processor transmits sound waves to the titanium implant, which in turn vibrates the patient's skull and inner ear to stimulate nerve fibers to the patient's inner ear, thus allowing hearing.

Bone-anchored hearing aid implantation surgery is often performed as an outpatient procedure.

By bypassing the outer or middle ear, bone-anchored hearing aids can increase hearing in noisy situations and help localize sounds.

In addition to improved speech comprehension, bone-anchored hearing aids generally provide a more natural sound with less distortion and feedback compared with conventional hearing aids.

Single-sided deafness is a condition in which a person has lost all hearing in one ear, while having anywhere from normal hearing to profound hearing loss in the other ear. Single-sided deafness makes it difficult to determine which direction sound is coming from (localization) and diminishes the ability to understand speech in noisy environments.

Common causes of single-sided deafness include acoustic neuroma (i.e., a tumor on the hearing nerve), Meniere's disease or sudden sensorineural hearing loss. Individuals who have single-sided deafness can wear a special pair of hearing aids that route sounds from the poorer hearing side to the better hearing side (called a CROS device), but a bone-anchored hearing device is often preferred by patients because it only requires the use of one device.

In patients with single-sided sensorineural deafness, bone-anchored hearing aids send the sound via the cranial bone from the deaf side to the inner ear of the hearing side.

Over time, the titanium implant integrates with the bone. The removable microphone and sound processor can then be attached via a built-in magnet or by clipping onto the abutment. The goal of a bone-anchored hearing aid is to obtain a snug fit to convey vibrations through the bone more effectively.

Bone-anchored hearing aids require an invasive surgical procedure and the introduction of foreign materials to the body with the goal of integrating into the patient's bone.

Moreover, bone-anchored hearing aids have the drawback of requiring sound waves to reach the side of the user or wearer's head in which the hearing aid is implanted. Therefore, it is common that interference, i.e. noise, can make it difficult for an individual to focus in on what he or she is trying to hear.

It is often necessary for an individual with a bone-anchored hearing aid due to bilateral conductive hearing loss to turn his or her head such that the side with the implant is closer to the source of the sound which the individual is trying to hear.

Accordingly, there is a need for bone-conduction hearing aid devices and methods which overcome the shortcomings of bone-anchored hearing aids. In particular, there is a need for bone-conduction hearing aid devices and methods which do not require invasive medical procedures, and which are capable of transmitting audio received or otherwise detected from a 360-degree radius around the listener.

Moreover, there is an ongoing need for means of transmitting and receiving audio discreetly. Regardless of whether a person has any degree of hearing impairment or not.

Furthermore, there is an ongoing need for means of transmitting and/or receiving audio in noisy environments, regardless of whether a person has any degree of hearing impairment or not.

Furthermore, there is an unmet need for wearable wireless communications technology that does not require anything to be attached to the outside of the body.

SUMMARY

The present inventor has surprisingly found that methods, systems and apparatuses described herein allow for 360-degree hearing for individuals with single-sided deafness and other hearing impairments, as well as individuals who do not have any hearing impairment. Namely, if a person or persons are speaking into their mobile device and this sound is transmitted to another mobile device, this sound can be transmitted to the wearable device thus creating a way of capturing sound in a 360 degree range. The distance of the person speaking is unlimited using both Bluetooth and cellular technology.

The present inventor has further surprisingly found that methods, systems and apparatuses described herein allow for individuals to carry out clear, intelligible communication in noisy environments without requiring any medical procedures or anything to be worn on the outside of the individual's body.

In an aspect, an intra-oral hearing appliance of the present disclosure includes an dental aligner apparatus; an actuator to provide bone conduction sound transmission; a transceiver coupled to the actuator to cause the actuator to generate sound; and a first chamber containing the actuator and the transceiver, said first chamber adapted to be coupled to one or more teeth.

Implementations of the above aspect may include one or more of the following.

An actuator driver or amplifier can be connected to the actuator. A second chamber can be used to house a power source to drive the actuator and the transceiver. A bridge can connect the first and second chambers. The bridge can have electrical cabling or an antenna embedded in the bridge. The bridge can be a wired frame, a polymeric material, or a combination of polymeric material and a wired frame. A mass can be connected to the actuator. The mass can be a weight such as tungsten or a suitable module with a mass such as a battery or an electronics module. The actuator can be a piezoelectric transducer. The configuration of the actuator can be a rectangular or cantilever beam bender configuration. One or more ceramic or alumina stands can connect the actuator to other components. A compressible material can surround the actuator. A non compressible material can cover the actuator and the compressible material. A rechargeable power source can power the transceiver and the actuator. An inductive charger can recharge the battery. The chamber can be a custom dental aligner device. A pre-built housing can be provided for the mass. The pre-built housing can have an arm and one or more bottom contacts, the arm and the contacts adapted to bias a mass against a tooth. A microphone can be connected to the transceiver, the microphone being positioned intraorally or extraorally. A data storage device can be embedded in the appliance. A first microphone can pick up body conduction sound, a second microphone can pick up ambient sound, and a noise canceller can be used to subtract ambient sound from the body conduction sound. The actuator transmits sound through a tooth, a maxillary bone, a mandibular bone, or a palatine bone. A linking unit can provide sound to the transceiver, the linking unit adapted to communicate with an external sound source. The transceiver can be a wired transceiver or a wireless transceiver.

Advantages of preferred embodiments may include one or more of the following. The dental aligner device with bone conduction is easy to wear and take off in use, and is further inconspicuous in appearance during the user's wearing thereof. The device can be operated without nearby people noticing the user's wearing of the device. The system is a multi-purpose communication platform that is rugged, wireless and secure. The device can be used in extreme environments such as very dusty, dirty or wet environments. The system provides quality, hands-free, yet inconspicuous communication capability for the user. The system overcomes hearing loss that can adversely affect a person's quality of life and psychological well-being. Solving such hearing impairment leads to reduced stress levels, increases self-confidence, increases sociability and increases effectiveness in the workplace.

The present invention provides for a bone-conduction device comprising, for example, a combination of the following:
  i) a dental aligner apparatus;
  ii) at least one power supply;
  iii) an audio transmitter and/or receiver;
  iv) a microphone;
  v) a processor; and
  vi) a vibrational transducer.

In another aspect, the invention described herein includes each of (i)— (vi).

The present invention provides for a system comprising:
  a) a bone-conduction device comprising
    i) a dental aligner apparatus;
    ii) at least one power supply;
    iii) an audio transmitter and/or receiver;
    iv) a microphone;
    v) a processor; and
    vi) a vibrational transducer; and
  b) at least one telecommunications device.

The disclosure further provides for a method of communication comprising wearing a bone-conduction device comprising:
  i) a dental aligner apparatus;
  ii) at least one power supply;
  iii) an audio transmitter and/or receiver;
  iv) a microphone;
  v) a processor; and
  vi) a vibrational transducer,
wherein said bone-conduction device is in wireless communication with a telecommunications device.

The present disclosure provides for methods of aiding hearing comprising wearing a bone-conduction device comprising:
  i) a dental aligner apparatus;
  ii) at least one power supply;
  iii) an audio transmitter and/or receiver;
  iv) a microphone;
  v) a processor; and
  vi) a vibrational transducer.
wherein said bone-conduction device is in wireless communication with a telecommunications device.

Further objects, features, and advantages of the invention will become apparent from the detailed description that follows.

DETAILED DESCRIPTION OF A PREFERRED EMBODIMENT

Figure 1A:
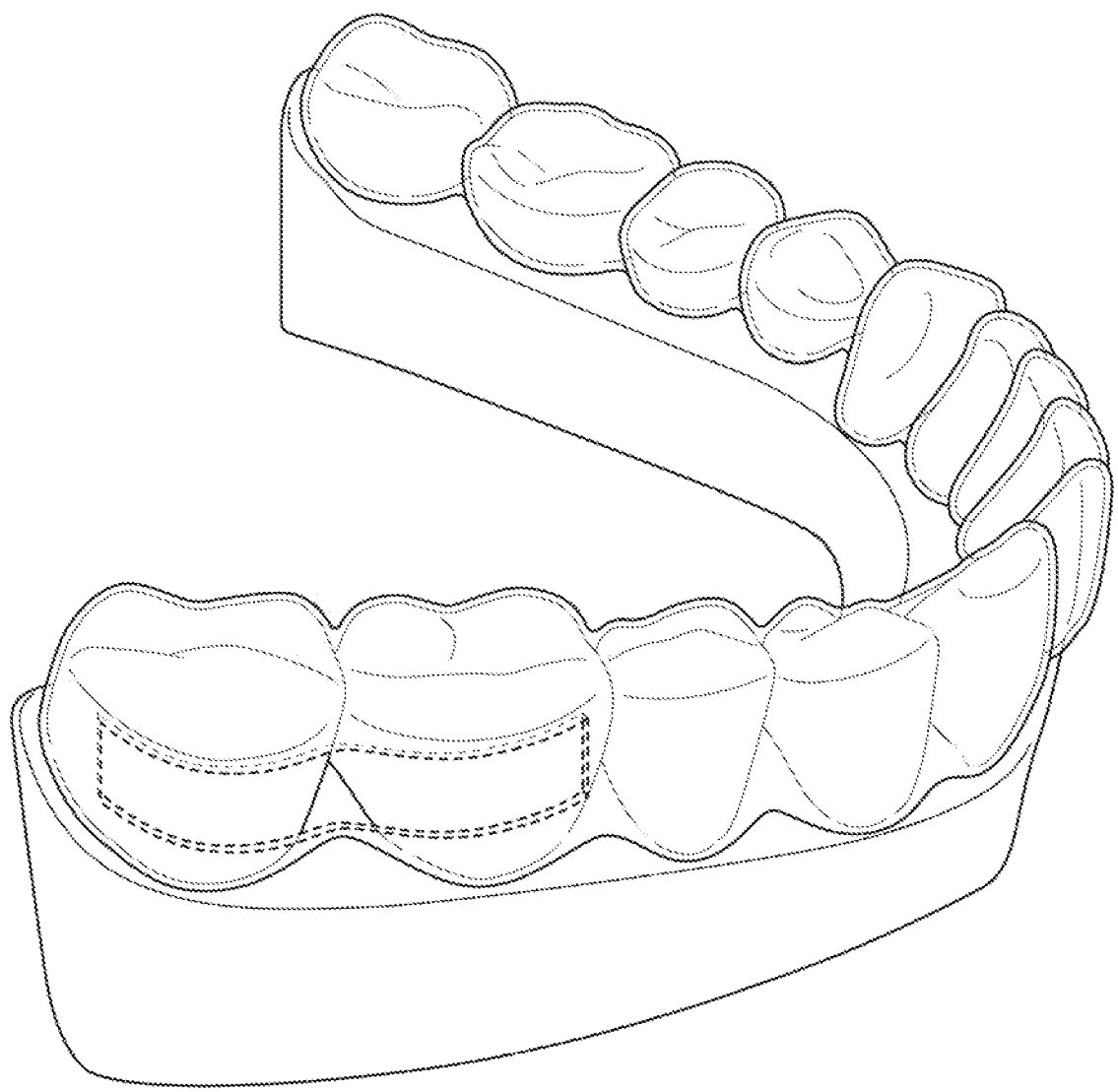
FIG. 1A depicts a perspective side view of an example configuration of a bone-conduction hearing device showing an exemplary cutout where the electronic portion of the device would be coupled.

The present inventor has now found that methods, systems and apparatuses and devices of the present invention provide a means of simultaneous receipt and transmission of audio to and from a telecommunication device.

Bone conduction technology has been used in hearing aids and to otherwise provide hearing assistance. However, many of these devices are designed for use with individuals that only have hearing loss.

Intra-oral bone-conduction hearing aid and telecommunications options have significant drawbacks which the methods, systems and apparatuses of the present invention overcome.

For instance, the Molar Mic is a non-surgical bone conduction prosthetic device designed to transmit sound via the teeth as an alternative to surgical bone conduction prosthetic devices requiring surgical implantation into the skull to conduct sound. The Molar Mic system is configured to receive audio from a walkie-talkie via a first wearable device around the wearer's neck, which would in turn transmit the audio to a vibrating second wearable device in a user's mouth. Likewise, a Molar Mic user's speech is transmitted by the intra-oral component to a wearable component around the user's neck, which would in turn transmit the user's speech audio to a communications device such as a walkie-talkie.

The present inventor has found that intra-oral bone-conduction methods, systems, and apparatuses of the present invention, however, are capable of both receiving and transmitting audio to and from a second device, such as a smartphone, tablet or computer, thereby eliminating the need for a further device. That is, the present invention does not require an intermediary. A previously known device called a molar mic is a device designed for the military for operative missions to communicate among team members. The instant invention in contradistinction comprises a wearable technology for the general public to receive sounds waves from a smart device and deliver it through a device that is located in the user's mouth and transmit sound to the $8^{th}$ cranial nerve of hearing. This would eliminate the need for the standard "blue tooth" device that is now used that is clipped to the ear and is obtrusive. One could use the instant device to communicate through phone calls and to dictate text messages. In addition, one could listen to any music and speech from for example, a smart phone, tablet, or smart tv. The only similarity in the two devices is that they both use Bluetooth and bone conduction technology. The applications and implementation details are completely different. With the instant method and apparatus, there would no longer be a need to for musicians, public speaking participants, or politicians giving speeches to wear monitoring earpieces during concerts or other speaking events. The device would change the way the world transmits and receives spoken and digital sound. Another differentiating feature of the instant method and device as compared \to the molar mic is be that the molar mic is attached to the teeth by wire like a retainer as used in orthodontics. In connection with the present invention on the other hand, the device can advantageously be attached by clear aligner technology which is a much more secure attachment mechanism.

Receiving and Transmitting Audio

In an aspect, a device of the present invention is capable of wirelessly transmitting audio to a telecommunications device, such as a smartphone or tablet.

In an aspect, a device of the present invention is capable of wirelessly receiving audio.

In an aspect, a device of the present invention is capable of both wirelessly transmitting audio and wirelessly receiving audio.

In certain embodiments, a bone-conduction device of the present invention is configured to transmit audio via any wireless form of transmission.

In certain embodiments, the wireless form of transmission is radio frequency.

In certain embodiments, the wireless form of transmission is Bluetooth®.

In certain embodiments, the wireless form of transmission is Wi-Fi.

Dental Aligners

As used herein, "dental tray" or "dental aligner" or "retainer" denotes a lightweight plastic alternative to metal dental braces.

As used herein, the term "dental aligner" refers interchangeably to a dental tray, a dental aligner or retainer intended for correcting or straightening a user's or wearer's teeth, a dental aligner or retainer not intended for correcting or straightening a user's or wearer's teeth, a retainer, a mouth guard, or any other wearable apparatus or device that is moulded to a user or wearer's teeth.

Generally, dental aligners are orthodontic devices that are a transparent plastic form of dental braces used to adjust teeth and which may be snugly worn on a person's (e.g., an orthodontic or dental patient's) teeth.

Dental aligners generally come in pairs with one aligner to be worn on the top row of teeth and the other aligner to be worn on the bottom row of teeth.

In general, a person wears a first set of dental aligners for a prescribed or otherwise designated period of time to allow his or her teeth to shift gradually until a second set of dental aligners is worn for a second prescribed or otherwise designated period of time.

Depending on the severity of correction or straightening desired or necessary, a person may wear one, two, three, four, five, six, seven, eight, nine, ten, eleven, twelve or more different sets of dental aligners.

Each subsequent set of dental aligners gradually shifts the person's teeth closer and closer to the finally desired straightness.

In an aspect, the present invention comprises a lightweight dental tray, aligner, or retainer.

In an aspect, the present invention comprises a dental aligner for use on a user's bottom row of teeth.

In an aspect, the present invention comprises a dental aligner for use on a user's top row of teeth.

In certain embodiments, the present invention comprises a dental aligner which is intended to straighten the user's teeth.

In certain embodiments, the present invention comprises a dental aligner which is not intended to straighten the user's teeth. That is, a user may have a dental aligner melded to his or her teeth such that the aligner will snugly affix onto his or her teeth without causing the teeth to shift.

In certain embodiments, a vibrational bone-conduction device of the present invention is implemented in connection with a segment of a dental aligner. That is, the dental aligner may, in some embodiments, only cover a segment of the user's bottom row of teeth, or a segment of the user's top row of teeth.

As used herein, "bone-conduction device of the present invention" means a device described herein which is incorporated into or otherwise combined with, either removably or irremovably, a dental aligner apparatus described herein.

The present disclosure provides for methods of communication and methods of aiding hearing comprising wearing a bone-conduction device described herein.

Transmission and Conduction of Vibrations

In certain embodiments, a system of the present invention or a bone-conduction device or a dental aligner apparatus of the present invention is worn such that the transducer is positioned or biased over or against at least one maxillary tooth.

In certain embodiments, a system of the present invention or a bone-conduction device or a dental aligner apparatus of the present invention is worn such that the transducer is positioned or biased over or against at least two maxillary teeth.

In certain embodiments, a system of the present invention or a bone-conduction device or a dental aligner apparatus of the present invention is worn such that the transducer is positioned or biased over or against at least three maxillary teeth.

In certain embodiments, a system of the present invention or a bone-conduction device or a dental aligner apparatus of the present invention is worn such that the transducer is positioned or biased over or against at least one mandibular tooth.

In certain embodiments, a system of the present invention or a bone-conduction device or a dental aligner apparatus of the present invention is worn such that the transducer is positioned or biased over or against at least two mandibular teeth.

In certain embodiments, a system of the present invention or a bone-conduction device or a dental aligner apparatus of the present invention is worn such that the transducer is positioned or biased over or against at least three mandibular teeth.

In certain embodiments, a system of the present invention or a bone-conduction device or a dental aligner apparatus of the present invention is worn such that the transducer is positioned or biased over or against or otherwise in contact with one or more mandibular bones.

In certain embodiments, a system of the present invention or a bone-conduction device or a dental aligner apparatus of the present invention is worn such that the transducer is positioned or biased over or against or otherwise in contact with one or more maxillary bones.

In certain embodiments, a system of the present invention or a bone-conduction device or a dental aligner apparatus of the present invention is worn such that the transducer is positioned or biased over or against or otherwise in contact with one or both palatine bones.

As used herein, "dental aligner apparatus of the present invention" means a dental aligner or retainer intended for correcting or straightening a user's or wearer's teeth, a dental aligner or retainer not intended for correcting or straightening a user's or wearer's teeth, a retainer, a mouth guard, or any other wearable apparatus or device that is moulded to a user or wearer's teeth and which is connected to, houses, or is otherwise combined, either removably or irremovably, with a bone-conduction device of the present invention.

The dental aligner apparatus of the present invention is, in certain embodiments, a custom-made apparatus produced via thermal forming processes or other customary manufacturing processes, wherein a physical or digital mould or other replica of a prospective user or wearer's teeth is used, having first been obtained by customary dental impression methods and/or digital imaging methods. In other instances the apparatus may comprise a kit where the patient follows directions to make a mold or molds and send the completed kit to a fabricator so the aligner can be manufactured.

The present disclosure provides for a dental aligner apparatus to be placed snugly over a user or wearer's teeth.

In certain embodiments, the dental aligner apparatus of the present invention comprises a dental aligner that snugly fits over a user or wearer's entire bottom row of teeth.

In certain embodiments, the dental aligner apparatus of the present invention comprises a dental aligner that snugly fits over part of a user or wearer's bottom row of teeth.

In certain embodiments, the dental aligner apparatus of the present invention comprises a dental aligner that snugly fits over a segment of one, two, three, four, five, six, or more of a user or wearer's bottom row of teeth.

In certain embodiments, the dental aligner apparatus of the present invention comprises a dental aligner that snugly fits over a user or wearer's entire top row of teeth.

In certain embodiments, the dental aligner apparatus of the present invention comprises a dental aligner that snugly fits over part of a user or wearer's top row of teeth.

In certain embodiments, the dental aligner apparatus of the present invention comprises a dental aligner that snugly fits over a segment of one, two, three, four, five, six, or more of a user or wearer's top row of teeth. In another aspect, the dental apparatus is clipped, attached, or otherwise fitted to one or more of the upper right, upper left, lower right, or lower left quadrant of the mouth. In another aspect, the dental apparatus is clipped, attached, or otherwise fitted to a single tooth or a combination of one or more of teeth numbers 1-16 or 17-32 as corresponding to the American Dental Association (ADA) Universal Numbering scheme. See, for example, https://radiopaedia.org/articles/american-dental-association-universal-numbering-system?lang=us, the content which is incorporated by reference in its entirety. In another aspect, the apparatus is clipped, attached, or otherwise fitted to a single tooth or a combination of teeth, for example, in the dental region of the right maxillary, left maxillary, left mandibular, right mandibular regions or combinations thereof.

In certain embodiments, the dental aligner apparatus of the present invention comprises a dental aligner that snugly fits over a user or wearer's entire bottom row of teeth and a dental aligner that snugly fits over a user or wearer's entire top row of teeth.

In certain embodiments, the dental aligner apparatus of the present invention comprises a dental aligner that snugly fits over a user or wearer's entire bottom row of teeth and a dental aligner that snugly fits over part of a user or wearer's top row of teeth.

In certain embodiments, the dental aligner apparatus of the present invention comprises a dental aligner that snugly fits over part of a user or wearer's bottom row of teeth and a dental aligner that snugly fits over a user or wearer's entire top row of teeth.

In certain embodiments, the dental aligner apparatus is used to straighten or otherwise correct the user or wearer's teeth.

In other embodiments, the dental aligner apparatus is not used to straighten or otherwise correct the user or wearer's teeth.

In certain embodiments, the dental aligner apparatus has a bone conduction device of the present invention imbedded therein.

In certain embodiments, the bone conduction device of the present invention is removable from the dental aligner apparatus.

The present disclosure provides for a bone-conduction device comprising:
i) a dental aligner apparatus;
ii) at least one power supply;
iii) an audio transmitter;
iv) an audio receiver;
v) a microphone;
vi) at least one processor; and
vii) a vibrational transducer.

In an aspect, the at least one power supply, audio transmitter, audio receiver, microphone, at least one processor, and vibrational transducer are housed within a single housing which is incorporated into or onto the dental aligner apparatus.

In certain embodiments, the microphone is configured to receive audio and to provide an output directly to a transmitter.

In certain embodiments, the microphone is configured to receive audio and to provide an output to a processor, which is configured to provide a processed output to a transmitter.

In an aspect, the transmitter is configured to provide output to a telecommunications device.

In an aspect, the receiver is configured to receive inputs from a telecommunications device.

In an aspect, the receiver, transmitter, and processor are configured such that the receiver may receive input and the transmitter may transmit output simultaneously.

In certain embodiments, the bone-conduction device of the present invention comprises a single processor which processes output from the receiver and output from the microphone.

In certain embodiments, the bone-conduction device of the present invention comprises a single processor which processes only output from the microphone.

In certain embodiments, the bone-conduction device of the present invention comprises a first processor which processes output from the receiver and a second processor which processes output from the microphone.

In certain embodiments, the receiver is configured to receive input and to provide an output to a processor, which is configured to provide a processed output to a transducer.

In certain embodiments, the receiver is configured to receive input and to provide an output directly to a transducer In certain embodiments, the bone-conduction device of the present invention comprises both a transmitter and a receiver.

Moreover, the present disclosure provides for a system comprising:
a) a bone-conduction device comprising
  i) a dental aligner apparatus;
  ii) at least one power supply;
  iii) an audio transmitter and/or receiver;
  iv) a microphone;
  v) a processor; and
  vi) a vibrational transducer; and
b) at least one telecommunications device.

The disclosure further provides for a method of communication comprising wearing a bone-conduction device comprising:
  i) a dental aligner apparatus;
  ii) at least one power supply;
  iii) an audio transmitter;
  iv) and audio receiver;
  v) a microphone;
  vi) a processor; and
  vii) a vibrational transducer,
wherein said bone-conduction device is in wireless communication with a telecommunications device.

In an aspect, the telecommunications device receives audio via a microphone built into the telecommunications device and transmits said audio to the receiver of the bone-conduction device of the present invention.

In an aspect, the telecommunications device receives audio from the transmitter of the bone-conduction device of the present invention via wireless connection.

In an aspect, the telecommunications device can relay any audio to the bone-conduction device of the present invention.

Figure 15:
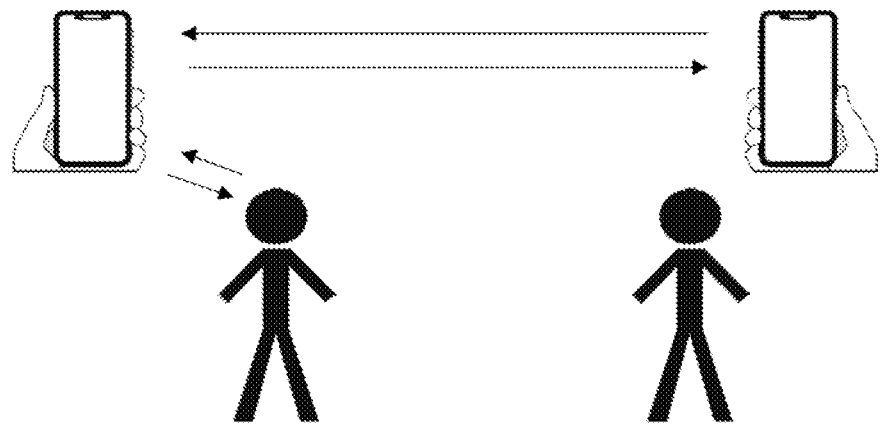
FIG. 15 depicts an embodiment of the method of the present invention wherein a user communicates with another person who is using a telecommunications device without a bone-conduction device of the present invention.
Figure 16:
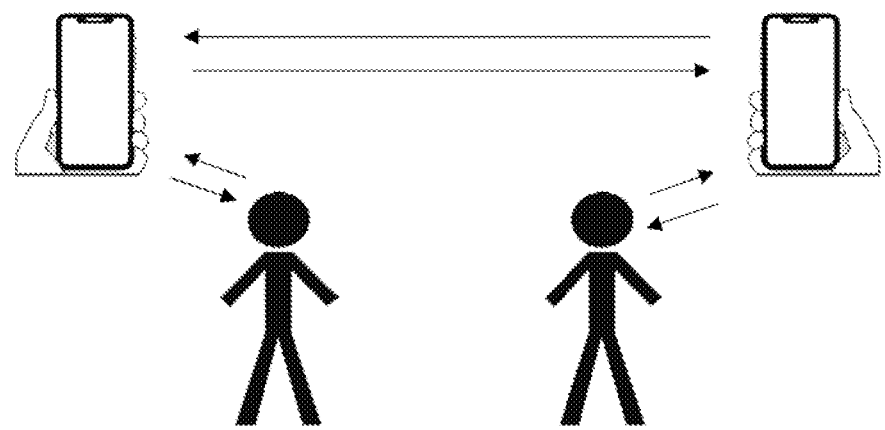
FIG. 16 depicts an embodiment of the method of the present invention wherein a user communicates with another person who is using a telecommunications device with a bone-conduction device of the present invention.

In an aspect, the telecommunications device may be in communication with another telecommunications device. For example, a phone call may be carried out by a user or wearer with another individual who may or may not be using a bone-conduction device of the present invention. See FIGS. 15 and 16.

The present disclosure provides for methods of aiding hearing comprising wearing a bone-conduction device comprising:
  i) a dental aligner apparatus;
  ii) at least one power supply;
  iii) an audio transmitter and/or receiver;
  iv) a microphone;
  v) a processor; and
  vi) a vibrational transducer.
wherein said bone-conduction device is in wireless communication with a telecommunications device.

The signals transmitted by the transmitter may be received by telecommunications devices and/or transducer assembly from a receiver, which may be connected to an internal processor for additional processing of the received signals.

The received signals may be communicated to transducer, which may vibrate correspondingly against a surface of the tooth to conduct the vibratory signals through the tooth and bone and subsequently to the middle ear to facilitate hearing of the user. The transducer may be configured in or as any vibratory mechanism.

In an aspect, any vibrational transducer may be used.

In one embodiment, the transducer may be an electro-magnetically actuated transducer.

In certain embodiments, the transducer is a piezoelectric crystal having a range of vibratory frequencies.

In certain embodiments, the transducer vibrates in a range of from 100 to 5,500 Hertz, or from 150 to 5,000 Hertz, or from 200 to 4,500 Hertz.

In an aspect, any power supply may be used. In certain embodiments, the power supply is a rechargeable battery. In certain embodiments, the power supply is a rechargeable lithium-based battery.

In certain embodiments, a single power supply or battery is used to provide power to all components of the bone-conduction device.

In certain embodiments, two or more power supplies or batteries are used to provide power to the components of the bone-conduction device.

In certain embodiments, one power supply or battery provides power to the microphone, transmitter and first processor, while a second power supply or battery provides power to the receiver, transducer and second processor.

In certain embodiments, one power supply or battery provides power to the microphone, transmitter and first processor, while a second power supply or battery provides power to the receiver and transducer.

In certain embodiments, each component of the bone-conduction device receives power from a different power supply or battery.

In certain embodiments, the power supply may be charged via wireless charging using a separate charging apparatus or device. In certain embodiments, the separate charging apparatus is a wireless charging apparatus, such as a Qi protocol charger.

In certain embodiments, the methods and systems of the present invention comprises a telecommunications device. In certain embodiments, the telecommunications device comprised is a smartphone or tablet or computer.

In an aspect, said smartphone or tablet application can be used to adjust the settings of the bone-conduction device of the present invention.

In an aspect, said smartphone or tablet application allows for the adjustment of all settings of the bone-conduction device.

In an aspect, said smartphone or tablet application allows for the adjustment of the sensitivity of the microphone of the bone-conduction device.

In an aspect, said smartphone or tablet application allows for the adjustment of the vibrational intensity of the transducer or speaker of the bone-conduction device.

Figure 1B:
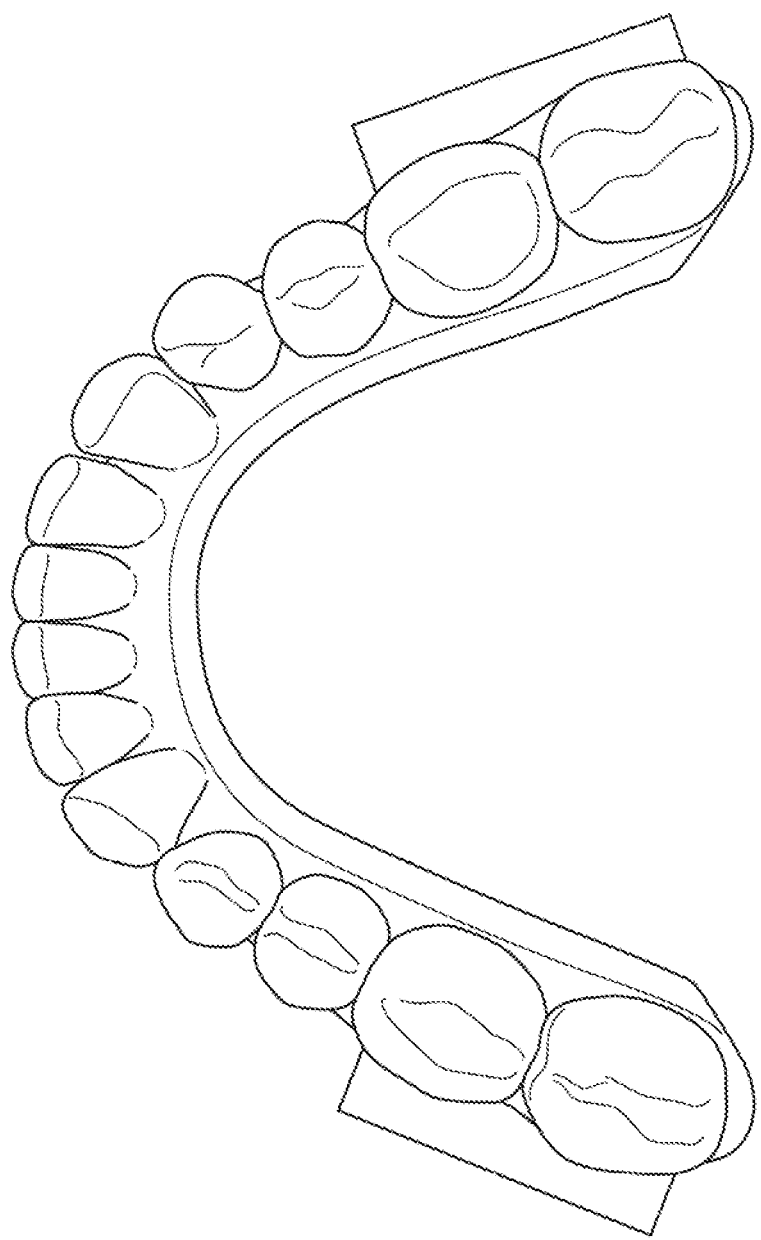
FIG. 1B shows a top view of an example configuration of a bone-conduction hearing device with the electronic portion of the device attached.
Figure 1C:
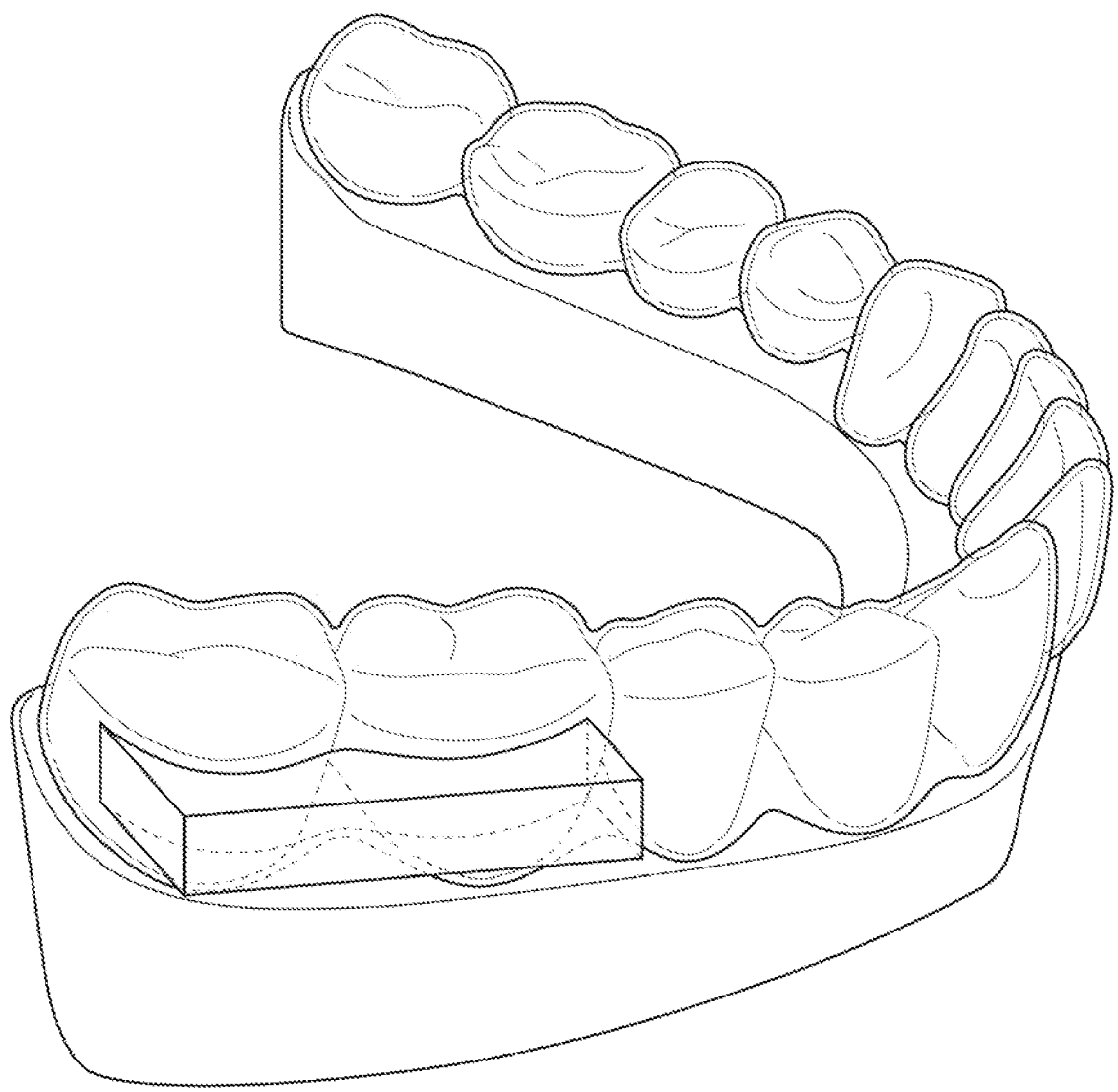
FIG. 1C shows a perspective side view of an example configuration of a bone-conduction hearing device with the electronic portion of the device attached.

FIG. 1A shows an embodiment of a bone-conduction device where a transparent dental alignment device is placed on the teeth, wherein a portion of the alignment device is removed so that the electronic portion of the bone-conduction device may be attached in place of the removed portion. FIGS. 1B and 1C show, respectively, top and side views of the bone-conduction device where the electronic portion of the bone-conduction device has been attached to the alignment device.

Figure 2:
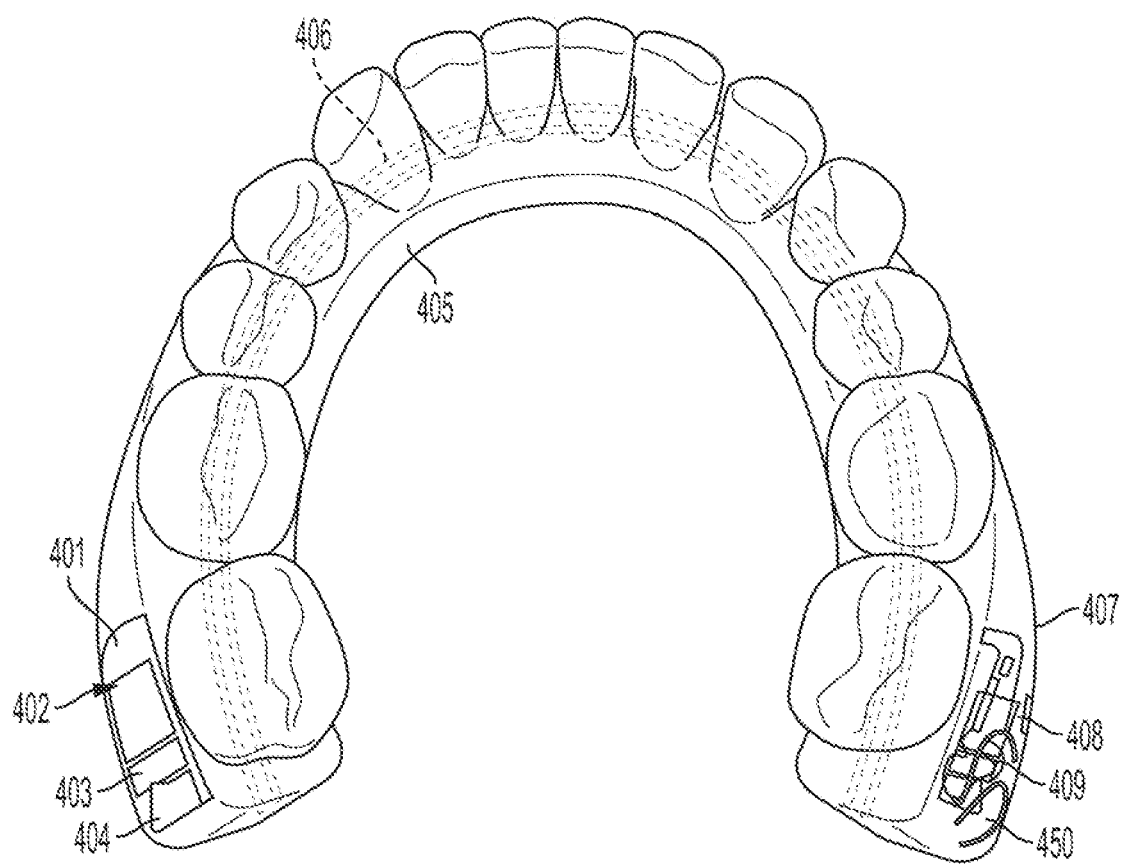
FIG. 2 depicts a top view of an example configuration of a bone-conduction hearing device.

FIG. 2 shows an exemplary bone-conduction device. The dental alignment device appliance is worn by a user on top of his or her oral cavity. The alignment device includes a power chamber 401 that supplies energy to power the appliance. The power chamber 401 includes an energy reservoir 402 such as a battery. The battery is charged by charger electronic 403 which can receive external energy through inductive coupling or can directly receive a charge through two terminals. If the charging is to be done inductively, a recharging coil 404 is also enclosed in the power chamber 401. The power chamber 401 provides energy actuation chamber 407. Mechanically, the chambers 401 and 407 can be connected by a bridge 405.

Inside the bridge 405 are cables that supply power to the actuation chamber 407. Other devices such as antenna wires can be embedded in the bridge 405. The chambers 401, 407 and the bridge 405 are made from human compatible elastomeric materials commonly used in dental retainers, inter alia.

Figure 3:
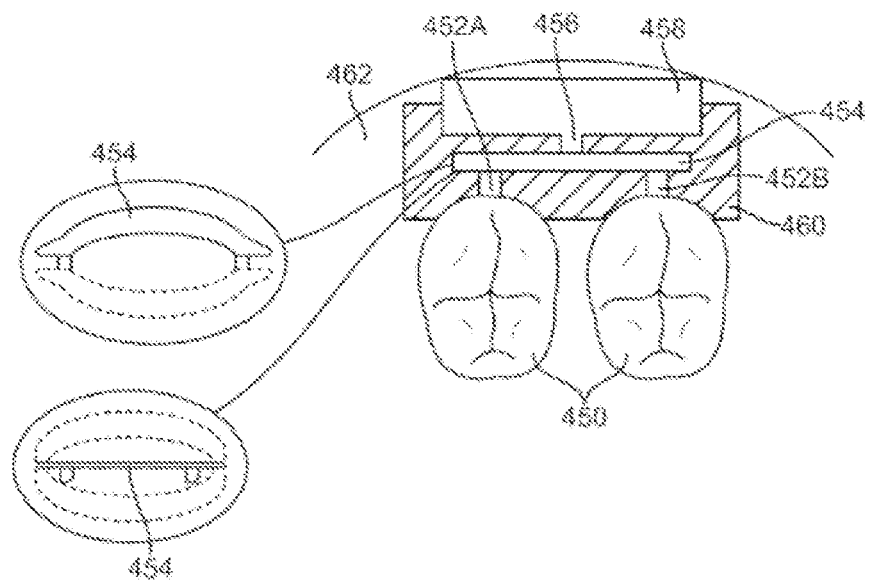
FIG. 3 shows a diagram illustrating the coupling of the actuator to one or more teeth.

FIG. 3 shows an exemplary cross-sectional view showing the coupling of the sound transducer to one or more teeth 450. In FIG. 3, a mounting unit 452 such as a dental aligner device is placed over one or more teeth 450. An actuator 454 rests above support arms or links 452A and 452B which are mechanically connected to the teeth 450.

In one embodiment, the actuator 454 is a piezoelectric transducer made with PZT. PZT-based compounds (Pb[Zrx-Ti1-x]O3<x<1, also lead zirconium titanate) are ceramic perovskite materials that develop a voltage difference across two of its facets when highly compressed. Being piezoelectric, it develops a voltage difference across two of its faces when compressed (useful for sensor applications), or physically changes shape when an external electric field is applied (useful for actuators and the like). The material is also ferroelectric, which means it has a spontaneous electric polarization (electric dipole) which can be reversed in the presence of an electric field. The material features an extremely large dielectric constant at the morphotropic phase boundary (MPB) near x=0.52. These properties make PZT-based compounds one of the most prominent and useful electroceramics.

The actuator 454 is also connected to a mass 458 through a mass arm 456. In one embodiment, the actuator 454 uses PZT in a rectangular beam bender configuration. The mass 458 can be a tungsten material or any suitable weight such as the battery or control electronics, among others. The support arms or links 452A-452B as well as the mass arm 456 are preferably made from ceramic or alumina which enables acoustic or sound energy to be efficiently transmitted by the mounting unit 454.

As shown in the two insets, the actuator 454 can be commanded to contract or expand, resulting in movements with upward arch shapes or downward arch shapes. The actuator 454 and its associated components are encapsulated in a compressible material 460 such as silicone to allow actuator movement. In one embodiment, the top of the electronics assembly is provided with an acrylic encapsulated protection layer 462 providing a fixed platform that directs energy generated by the actuator 454 toward the teeth while the compressible material 460 provides room for movement by the actuator 454.

Figure 4:
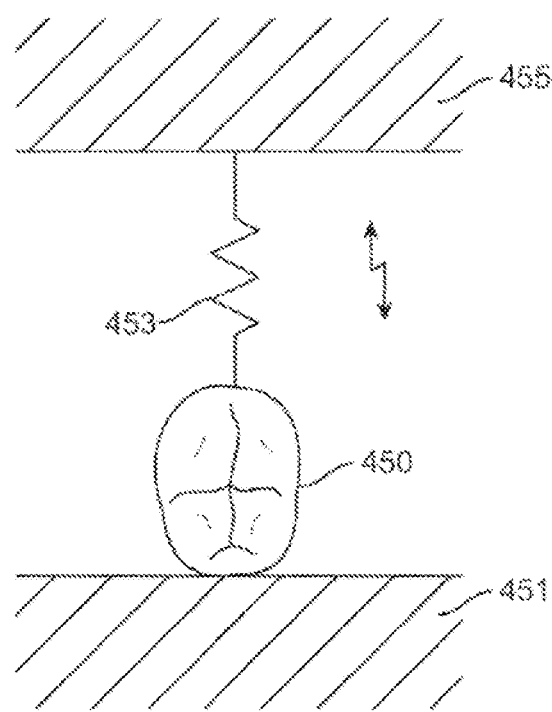
FIG. 4 depicts an equivalent model of the coupling of the actuator to the teeth.

FIG. 4 shows a schematic equivalent of the system of FIG. 3. In the model of FIG. 4, a tooth 450 is fixed between bone structure 451 and a mounting unit 455 such as a dental aligner device, both of which are spatially fixed in the model. An actuator 453 provides resistance to drive energy into the tooth 450. Although FIG. 4 shows two fixed point connections, it is contemplated that the actuator 452 can have one fixed point connection as well. This resistance between the tooth and the dental aligner device applies the coupling force necessary to keep the actuator in contact with the tooth at high frequencies.

Figure 5:
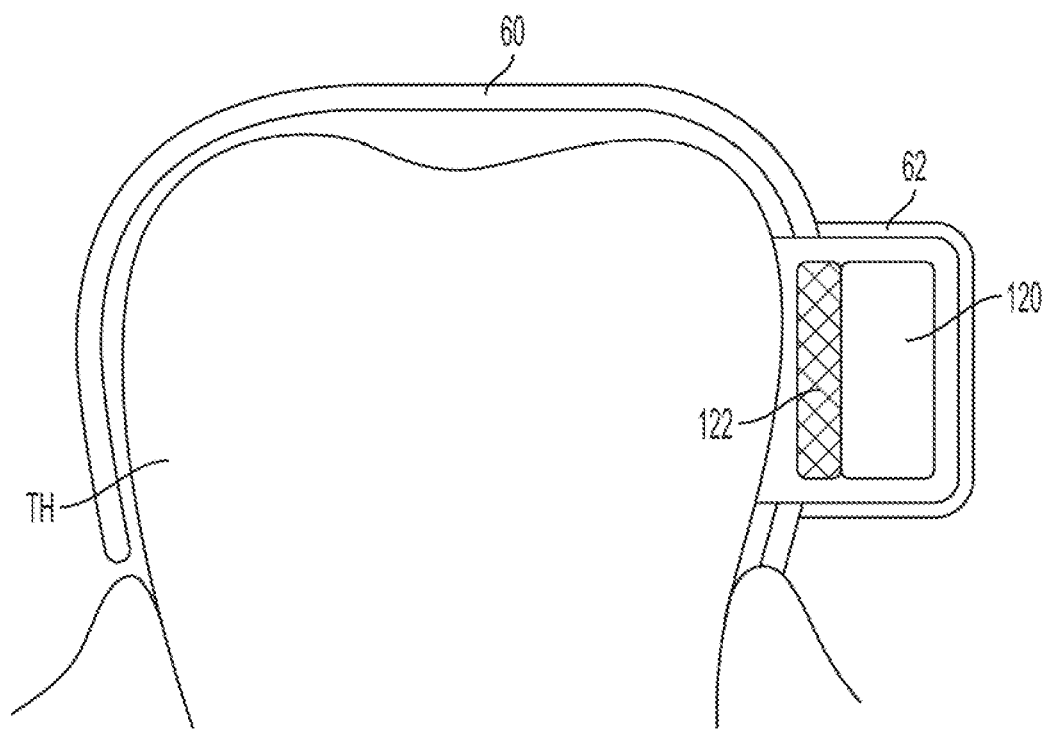
FIG. 5 depicts a partial cross-sectional view of an example configuration of a bone-conduction hearing device.

In an embodiment shown in FIG. 5, electronics and/or transducer assembly 120 may be positioned within housing 62 and attached to dental alignment device 60. The electronics and/or transducer assembly 120 is optionally attached to an optional interface layer 122 positioned between the assembly 120 and the tooth surface. Interface layer 122 may be configured to conform against the tooth surface and against assembly 120 such that vibrations may be transmitted through layer 122 and to the tooth in a uniform manner. Accordingly, interface layer 122 may be made from a material which attenuates vibrations minimally. Interface layer 122 may be made in a variety of forms, such as a simple insert, an O-ring configuration, etc. or even in a gel or paste form, such as denture or oral paste, etc. Additionally, interface layer 122 may be fabricated from various materials, e.g., hard plastics or polymeric materials, metals, etc.

Figure 6:
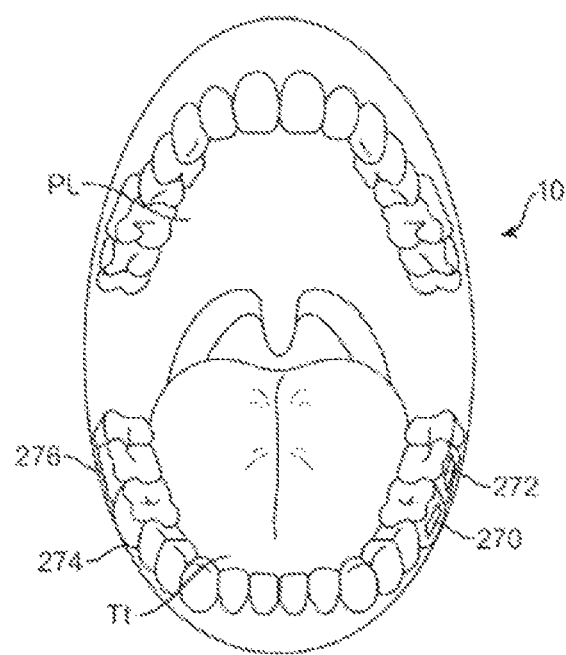
FIG. 6 depicts an example of how a bone-conduction device may be positioned on multiple locations of a dental alignment device.

For any of the variations described herein, they may be utilized as a single device or in combination with any other variation herein, as practicable, to achieve the desired hearing level in the user. Moreover, more than one dental alignment device and electronics and/or transducer assemblies may be utilized at any one time. For example, FIG. 6 illustrates one example where multiple transducer assemblies 270, 272, 274, 276 may be placed on a dental alignment device (not shown) at the locations of multiple teeth. Although shown on the lower row of teeth, multiple assemblies may alternatively be positioned and located along the upper row of teeth or both rows as well. Moreover, each of the assemblies may be configured to transmit vibrations within a uniform frequency range. Alternatively in other variations, different assemblies may be configured to vibrate within non-overlapping frequency ranges between each assembly. As mentioned above, each transducer 270, 272, 274, 276 can be programmed or preset for a different frequency response such that each transducer may be optimized for a different frequency response and/or transmission to deliver a relatively high-fidelity sound to the user.

Figure 7:
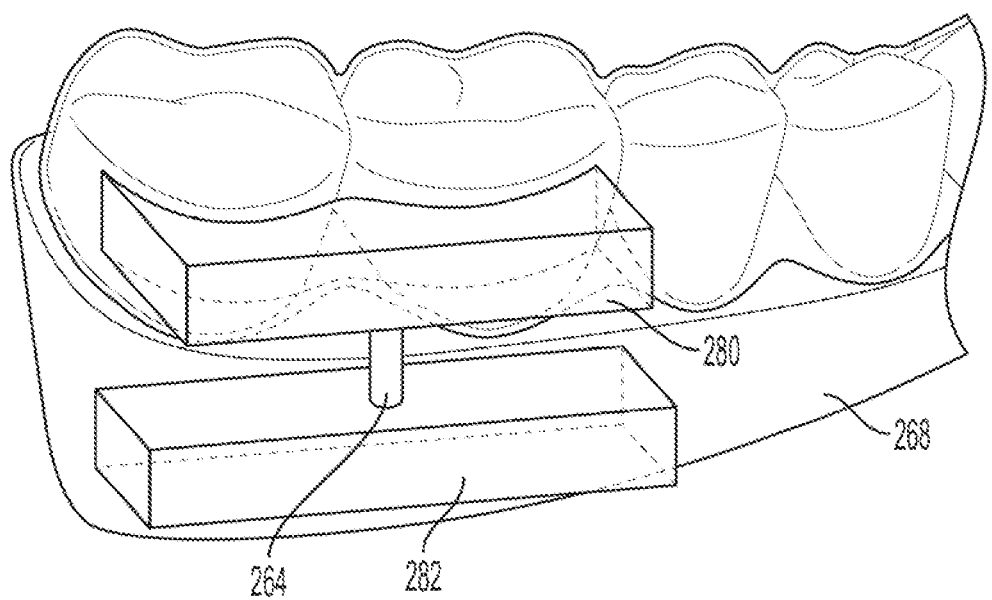
FIG. 7 depicts a partial perspective side view of an example configuration of a bone-conduction hearing device.
Figure 8:
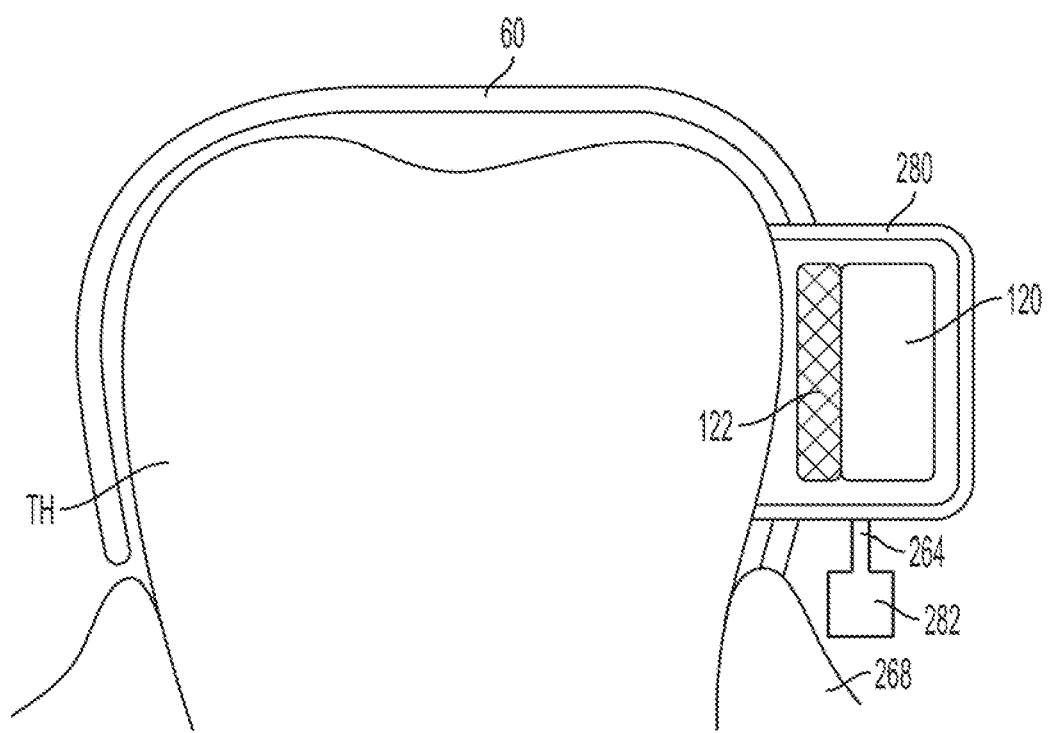
FIG. 8 depicts a partial cross-sectional view of an example configuration of a bone-conduction hearing device.
Figure 9:
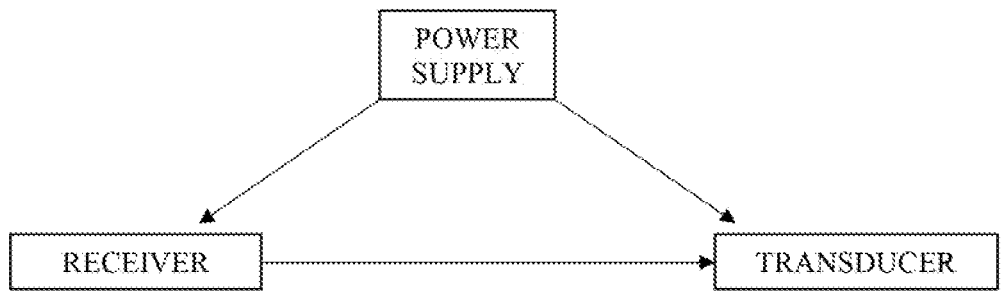
FIG. 9 depicts an example configuration of the present invention, wherein a power supply provides power to a receiver and to a transducer, and wherein the receiver receives an input (e.g., audio) from a second device such as a smartphone or tablet, and the receiver subsequently provides an output to the transducer, which vibrates against a user or wearer's tooth, teeth, bone or bones.
Figure 10:
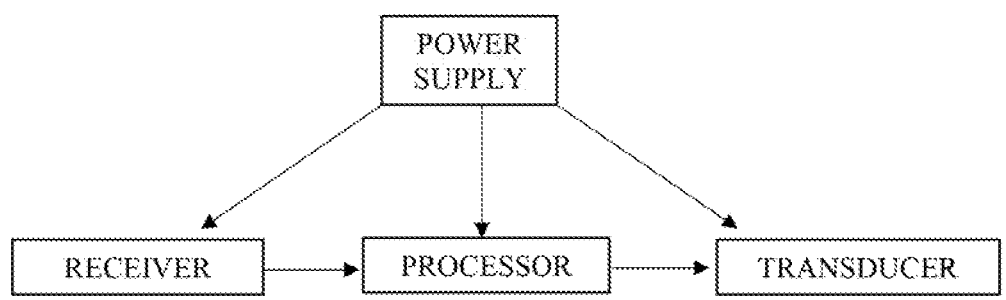
FIG. 10 depicts an example configuration of the present invention, wherein a power supply provides power to a receiver, to a processor, and to a transducer, and wherein the receiver receives an input (e.g., audio) from a second device such as a smartphone or tablet, and the receiver subsequently provides an output to the processor, which in turn provides a processed output to the transducer, which vibrates against a user or wearer's tooth, teeth, bone or bones.
Figure 11:
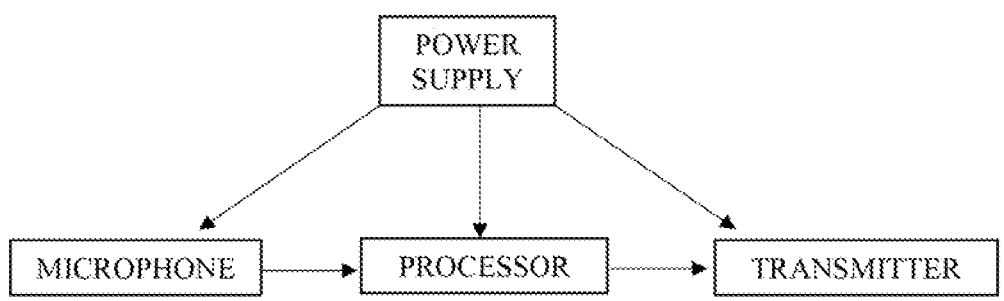
FIG. 11 depicts an example configuration of the present invention, wherein a power supply provides power to a microphone, to a processor, and to a transmitter, and wherein the microphone receives an input from a user or wearer (e.g., speech) and the microphone subsequently provides an output to the processor, which in turn provides a processed output to the transmitter, which transmits the processed output to a second device, such as a smartphone or tablet. The configuration depicted in FIG. 11 can, in an aspect, be combined with the configuration of either FIG. 9 or of FIG. 10. That is, separate power supplies would be used in the configuration of FIG. 11 and in the configuration of FIG. 9 or FIG. 10.
Figure 12:
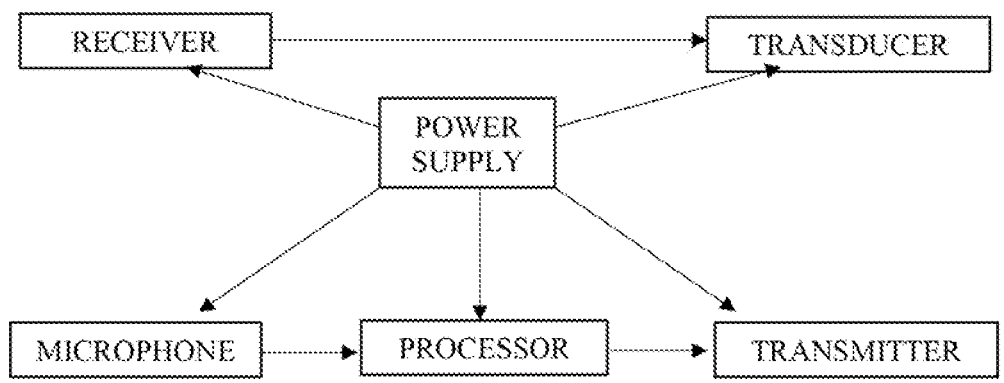
FIG. 12 depicts an example configuration of the present invention, wherein one power supply provides power to each of a microphone, to a processor, to a transmitter, to a receiver, and to a transducer, and wherein the receiver receives an input from a second device (such as a smartphone or tablet) and in turn provides the input to the transducer, which vibrates against a user or wearer's tooth, teeth, bone or bones; the configuration further provides for a microphone which receives an input from the user or wearer (e.g., speech) and in turn provides said input to a processor, which in turn provides a processed input to the transmitter, which in turn provides the processed output to a second device (such as a smartphone or tablet).
Figure 13:
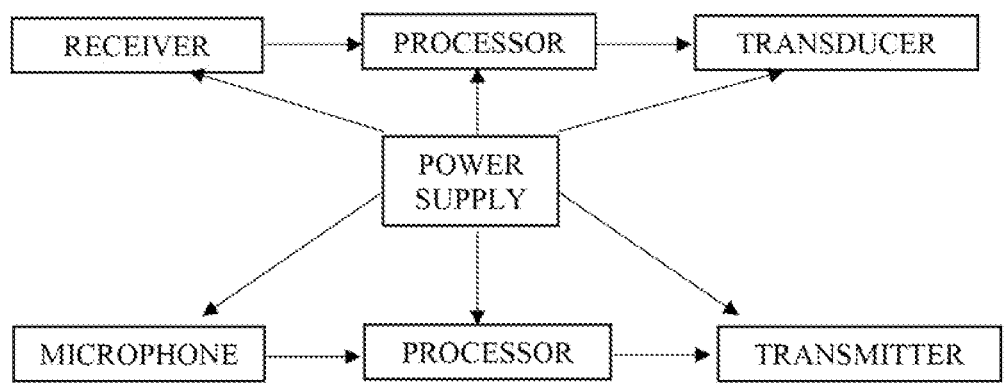
FIG. 13 depicts an example configuration of the present invention, wherein one power supply provides power to each of a microphone, to a first processor, to a transmitter, to a receiver, to a processor, and to a transducer, and wherein the receiver receives input from a second device (such as a smartphone or tablet) and in turn provides the input to a processor, which in turn provides a processed input the transducer, which vibrates against a user or wearer's tooth, teeth, bone or bones; the configuration further provides for a microphone which receives an input from the user or wearer (e.g., speech) and in turn provides said input to the first processor, which in turn provides a processed output to the transmitter, which in turn provides the processed output to a second device (such as a smartphone or tablet).
Figure 14:
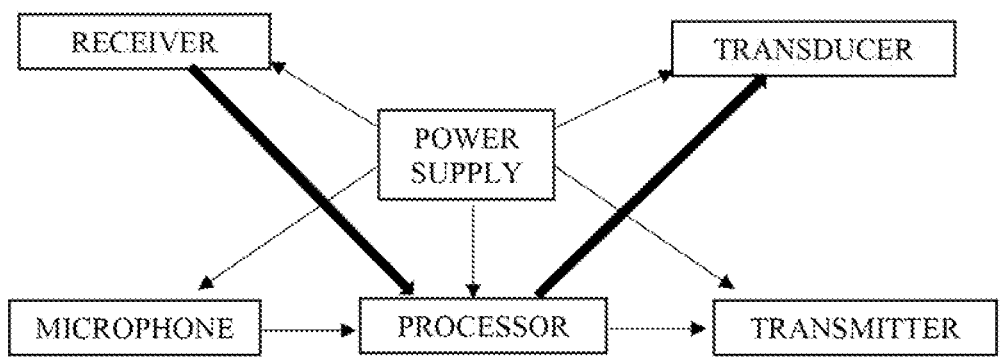
FIG. 14 depicts an example configuration of the present invention, wherein one power supply provides power to each of a microphone, to a processor, to a transmitter, to a receiver, and to a transducer, and wherein the receiver receives input from a second device (such as a smartphone or tablet) and in turn provides the input to the processor, which in turn provides a processed input the transducer, which vibrates against a user or wearer's tooth, teeth, bone or bones; the configuration further provides for a microphone which receives an input from the user or wearer (e.g., speech) and in turn provides said input to the same processor, which in turn provides a processed output to the transmitter, which in turn provides the processed output to a second device (such as a smartphone or tablet.

In variations where one or more microphones are present, the microphone may be integrated directly into the electronics and/or transducer assembly. However, in additional variation, the microphone unit may be positioned at a distance from the transducer assemblies to minimize feedback. In one example, microphone unit 282 may be separated from electronics and/or transducer assembly 280, as shown in FIGS. 7 and 8. In such a variation, the microphone unit 282 positioned upon or adjacent to the gingival surface 268 may be electrically connected via wire(s) 264.

In one embodiment where the unit is used as a hearing aid, a microphone can provide sound input that is amplified by an amplifier or driver. In another embodiment, the system can receive signals from a linking unit such as a Bluetooth transceiver that allows the appliance to play sound generated by a portable appliance or a sound source such as a music player, a hands-free communication device or a cellular telephone, for example. Alternatively, the sound source can be a computer, a one-way communication device, a two-way communication device, or a wireless hands-free communication device.

The appliance is a custom dental aligner device. The sound source unit can contain a short- or long-range transceiver that is protocol compatible with the linking unit. The transceiver linking unit can communicate with sound sources over a variety of protocols, including, but not limited to, Bluetooth and WiFi transmissions, combinations of the two, or other similar protocols. For example, the sound source can have a Bluetooth transceiver that communicates with the Bluetooth transceiver linking unit in the appliance. The appliance can then receive the data transmitted over the Bluetooth protocol and drive a bone conduction transducer to render or transmit sound to the user. Similarly, the sound source can have a WiFi transceiver that communicates with the WiFi transceiver linking unit in the appliance. The appliance can then receive the data transmitted over the WiFi protocol and drive a bone conduction transducer to render or transmit sound to the user.

The appliance can have a microphone embedded therein. The microphone can be an intraoral microphone or an extraoral microphone. For cellular telephones and other telephones, a second microphone can be used to cancel environmental noise and transmit a user's voice to the telephone. A noise canceller receives signals from the microphones and cancels ambient noise to provide a clean sound capture.

The appliance can have another microphone to pick up ambient sound. The microphone can be an intraoral microphone or an extraoral microphone. In one embodiment, the microphone cancels environmental noise and transmits a user's voice to the remote station. This embodiment provides the ability to cancel environmental noises while transmitting subject's own voice to the actuator. As the microphone is in a fixed location (compared to ordinary wireless communication devices) and very close to user's own voice, the system can handle environmental noise reduction that is important in working in high noise areas.

The system couples microphones and voicing activity sensors to a signal processor. The processor executes a detection algorithm, and a denoising code to minimize background acoustic noise. Two microphones can be used, with one microphone being the bone conduction microphone and one which is considered the "signal" microphone. The second microphone captures air noise or ambient noise, whose signal is filtered and subtracted from the signal in the first microphone. In one embodiment, the system runs an array algorithm for speech detection that uses the difference in frequency content between two microphones to calculate a relationship between the signals of the two microphones. As known in the art and discussed in U.S. Pat. No. 7,246,058, the content of which is incorporated by reference, this embodiment can cancel noise without requiring a specific orientation of the array with respect to the signal.

The appliance can include a data storage device such as a solid state memory or a flash storage device. The content of the data storage device can be encrypted for security. The linking unit can transmit encrypted data for secure transmission if desired.

In an aspect, the dental aligner device is clear and may be fabricated from various polymeric or a combination of polymeric and metallic materials using any number of methods, such as computer-aided machining processes using computer numerical control (CNC) systems or three-dimensional printing processes, e.g., stereolithography apparatus (SLA), selective laser sintering (SLS), and/or other similar processes utilizing three-dimensional geometry of the patient's dentition, which may be obtained via any number of techniques. Such techniques may include use of scanned dentition using intra-oral scanners such as laser, white light, ultrasound, mechanical three-dimensional touch scanners, magnetic resonance imaging (MRI), computed tomography (CT), other optical methods, etc. Examples of dental aligner devices are known in the art, for example in U.S. Pat. Nos. 5,975,893, 6,299,440, 6,524,101, 6,790,035, 6,830,450, 6,976,627, 7,140,877, 7,201,576, 7,255,561, 7,306,152, 7,545,372, 7,553,157, 7,611,058, 7,711,447, 7,854,609, 7,878,801, 7,878,805, 7,901,207, 7,904,307, 7,905,724, 7,916,911, 8,038,444, 8,155,780, 8,235,713, 8,641,414, 8,899,976, 8,899,977, 8,995,732, 9,004,915, 9,107,722, 9,301,814, 9,326,830, 9,403,238, 9,408,675, 9,433,477, 9,566,132, 9,655,691, 9,655,693, 9,839,494, 9,844,421, 9,939,999, 9,943,386, 9,943,991, 10,004,578, 10,052,176, 10,085,823, 10,123,853, 10,136,964, 10,143,537, 10,154,889, 10,271,923, 10,299,894, 10,332,164, 10,335,252, 10,405,947, 10,413,385, 10,420,631, 10,421,152, 10,456,217, 10,501,214, 10,512,524, 10,537,405, 10,537,406, 10,524,879, 10,531,934, 10,553,309, 10,595,965, 10,595,966, 10,610,332, 10,613,515, 10,646,307, 10,650,517, 10,653,502, 10,695,956, and 10,702,357, each of which is herein incorporated by reference in its entirety.

In one variation, an extra-buccal transmitter assembly located outside the patient's mouth may be utilized to receive auditory signals for processing and transmission via a wireless signal to the electronics and/or transducer assembly positioned within the user's mouth, which may then process and transmit the processed auditory signals via vibratory conductance to the underlying tooth and consequently to the user's inner ear. The transmitter assembly, as described in further detail below, may contain a microphone assembly as well as a transmitter assembly and may be configured in any number of shapes and forms worn by the user, such as a watch or phone.

With respect to a microphone, a variety of various microphone systems may be utilized. For instance, the microphone may be a digital, analog, and/or directional type microphone. Such various types of microphones may be interchangeably configured to be utilized with the assembly, if so desired.

A power supply may be connected to each of the components in the transmitter assembly to provide power thereto. The transmitter signals may be in any wireless form utilizing, e.g., radio frequency, ultrasound, microwave, Blue Tooth® (BLUETOOTH SIG, INC., Bellevue, Wash.), etc. for transmission to assembly. Assembly may also optionally include one or more input controls that a user may manipulate to adjust various acoustic parameters of the electronics and/or transducer assembly, such as acoustic focusing, volume control, filtration, muting, frequency optimization, sound adjustments, and tone adjustments, etc.

The signals transmitted by transmitter may be received by electronics and/or transducer assembly via receiver, which may be connected to an internal processor for additional processing of the received signals. The received signals may be communicated to transducer, which may vibrate correspondingly against a surface of the tooth to conduct the vibratory signals through the tooth and bone and subsequently to the middle ear to facilitate hearing of the user. Transducer may be configured as any number of different vibratory mechanisms. For instance, in one variation, transducer may be an electromagnetically actuated transducer. In other variations, transducer may be in the form of a piezoelectric crystal having a range of vibratory frequencies, e.g., between 250 to 4000 Hz.

Power supply may also be included with assembly to provide power to the receiver, transducer, and/or processor, if also included. Although power supply may be a simple battery, replaceable or permanent, other variations may include a power supply which is charged by inductance via an external charger. Additionally, power supply may alternatively be charged via direct coupling to an alternating current (AC) or direct current (DC) source. Other variations may include a power supply which is charged via a mechanical mechanism, such as an internal pendulum or slidable electrical inductance charger as known in the art, which is actuated via, e.g., motions of the jaw and/or movement for translating the mechanical motion into stored electrical energy for charging power supply.

In order to transmit the vibrations corresponding to the received auditory signals efficiently and with minimal loss to the tooth or teeth, secure mechanical contact between the transducer and the tooth is ideally maintained to ensure efficient vibratory communication. Accordingly, any number of mechanisms may be utilized to maintain this vibratory communication.

In any of the embodiments described herein, the dental aligner device is modified to accommodate the actuator, transceiver and first chamber. Exemplary modifications include, but not are limited to, removal of at least one portion of the dental aligner device such that the actuator, transceiver, and first chamber may be inserted in the space left after removal of said portion. In an embodiment, the at least one portion to be removed is on the buccal surface of the dental aligner device. In another embodiment, the at least one portion to be removed is on the lingual surface of the dental aligner device. In yet another aspect, at least one portion is removed from the lingual surface of the dental aligner device and at least one portion is removed from the buccal surface of the dental aligner device.

In an aspect, the dental alignment device is formed from a thin sheet of a suitable elastomeric polymer, such as Tru-Tain 0.03 in. thermal forming dental material (Tru-Tain Plastics, Rochester, Minnesota 55902).

Where at least one portion of the dental aligner device is removed to accommodate insertion of the actuator, transceiver, and first chamber, said removal may occur in a position corresponding to one or more teeth. In an aspect, the at least one portion to be removed corresponds to the buccal and/or lingual surface of the first molar on the user's upper right side (tooth number 3 using universal numbering system). In an aspect, the at least one portion to be removed corresponds to the buccal and/or lingual surface of the second molar on the user's upper right side (tooth number 2). In an aspect the at least one portion to be removed corresponds to the buccal and/or lingual surface of the third molar ("wisdom tooth") on the user's upper right side (tooth number 1). In an aspect, the at least one portion to be removed corresponds to the buccal and/or lingual surface of the first molar on the user's upper left side (tooth number 14). In an aspect, the at least one portion to be removed corresponds to the buccal and/or lingual surface of the second molar on the user's left right side (tooth number 15). In an aspect the at least one portion to be removed corresponds to the buccal and/or lingual surface of the third molar ("wisdom tooth") on the user's upper left side (tooth number 16). In an aspect, the at least one portion to be removed corresponds to the buccal and/or lingual surface of the first molar on the user's lower right side (tooth number 30). In an aspect, the at least one portion to be removed corresponds to the buccal and/or lingual surface of the second molar on the user's lower right side (tooth number 31). In an aspect the at least one portion to be removed corresponds to the buccal and/or lingual surface of the third molar ("wisdom tooth") on the user's lower right side (tooth number 32). In an aspect, the at least one portion to be removed corresponds to the buccal and/or lingual surface of the first molar on the user's lower left side (tooth number 19). In an aspect, the at least one portion to be removed corresponds to the buccal and/or lingual surface of the second molar on the user's lower left side (tooth number 18). In an aspect the at least one portion to be removed corresponds to the buccal and/or lingual surface of the third molar ("wisdom tooth") on the user's lower left side (tooth number 17). In an aspect the at least one portion to be removed corresponds to one or more teeth selected from the group consisting of tooth numbers 1, 2, 3, 14, 15, 16, 17, 18, 19, 30, 31, and 32. Additional aspects include any of the above aspects, but where no additional portions are removed except the identified portion. Further aspects include instances where the removed portion corresponds to the buccal surface and not to the lingual surface, instances where the removed portion corresponds to the lingual surface and not to the buccal surface, instances where a portion is removed only from an aligner device fitting a patient's upper teeth and not the lower teeth, and instances where a portion is removed only from an aligner device fitting a patient's lower teeth and not the upper teeth.

In any of the embodiments described herein, it is further envisioned that the intra-oral hearing appliance system of the present disclosure does not comprise an intermediary device (e.g., neckloop, earpiece, or similar). In other words, it is envisioned that transmitting and receiving of Bluetooth and/or WiFi signals may occur directly between the intra-oral hearing appliance device and the sound source (e.g., computer, cellular telephone, tablet, etc.).

The applications of the devices and methods discussed above are not limited to the treatment of hearing loss but may include any number of further treatment applications. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

The invention claimed is:

1. A bone-conduction device for aiding hearing, comprising:
   a) a first housing configured to engage one or more teeth, wherein said first housing is a transparent dental aligner device; and
   b) a second housing coupled to the first housing, wherein the second housing comprises:
      b1) at least one transducer arranged such that the transducer is in vibratory contact with the one or more teeth via at least one support arm;
      wherein a tungsten mass is connected to the transducer via a mass arm; and
      b2) circuitry coupled to the at least one transducer, wherein the circuitry comprises a signal processor, a power supply, a transmitter and/or a receiver, and an antenna;
   wherein the transparent dental aligner device comprises an elastomeric polymer;

wherein at least one portion of the first housing is removed and the second housing is inserted in a space left from the at least one portion that is removed; and wherein the at least one portion of the first housing that is removed corresponds to the buccal surface of the first housing corresponding to one or more teeth selected from the group consisting of tooth numbers 17, 18, 19, 30, 31, and 32.

2. The device of claim 1, wherein the device further comprises at least one microphone, wherein the at least one transducer is in communication with the at least one microphone and the at least one transducer vibrates in accordance with signals from the at least one microphone and conducts an audio signal through the one or more teeth.

3. The device of claim 2, wherein the at least one microphone is contained in a microphone housing coupled to the at least one transducer.

4. The device of claim 1, wherein the at least one portion of the first housing that is removed corresponds to the buccal surface of the housing corresponding to one or more teeth selected from the group consisting of tooth numbers 18, 19, 30, and 31.

5. A method of aiding hearing in an individual wearing the bone-conduction device according to claim 1 comprising:
receiving a first input at a receiver from a telecommunication device;
generating a first output via the receiver;
receiving the first output at the transducer;
vibrating against at least one of at least one tooth or at least one bone of the individual via the transducer;
receiving a second input at a microphone;
generating a second output via the microphone;
receiving the second output at a processor;
generating a third output via the processor;
receiving the third output at a transmitter; and
transmitting the third output to the telecommunication device;
wherein said bone-conduction device is in wireless communication with the telecommunication device.

6. The method according to claim 5, wherein the individual has single-sided deafness, optionally due to sensory neural disfunction or severe unilateral hearing loss due to conductive hearing loss.

7. The method according to claim 5, wherein the transducer is positioned or biased over or against or otherwise in contact with at least one of one or more maxillary, mandibular, and palatine bones.

8. A hearing device, comprising:
a) a first housing configured to engage one or more teeth;
b) a second housing coupled to the first housing, wherein the second housing comprises:
b1) at least one transducer arranged such that the transducer is in vibratory contact with the one or more teeth via at least one support arm;
wherein a tungsten mass is connected to the transducer via a mass arm; and
b2) circuitry coupled to the at least one transducer, wherein the circuitry comprises a signal processor, a power supply, a transmitter and/or a receiver, and an antenna;
wherein at least one portion of the first housing is removed and the second housing is inserted in a space left from the at least one portion that is removed.

9. The device of claim 8, wherein said first housing is a transparent dental aligner device.

10. The device of claim 9, wherein the transparent dental aligner device comprises an elastomeric polymer.

11. The device of claim 8, wherein the device further comprises at least one microphone, wherein the at least one transducer is in communication with the at least one microphone and the at least one transducer vibrates in accordance with signals from the at least one microphone and conducts an audio signal through the one or more teeth.

12. The device of claim 8, wherein the at least one portion of the first housing that is removed corresponds to the buccal or lingual surface of the first housing corresponding to one or more teeth selected from tooth numbers 1, 2, 3, 14, 15, 16, 17, 18, 19, 30, 31, and 32.

13. The device of claim 8, wherein the at least one portion of the first housing that is removed corresponds to the buccal surface of the first housing corresponding to one or more teeth selected from tooth numbers 1, 2, 3, 14, 15, 16, 17, 18, 19, 30, 31, and 32.

14. The device of claim 8, wherein the at least one portion of the first housing that is removed corresponds to the lingual surface of the first housing corresponding to one or more teeth selected from tooth numbers 1, 2, 3, 14, 15, 16, 17, 18, 19, 30, 31, and 32.

15. A system comprising (a) the hearing device of claim 8 and (b) a sound source, wherein the hearing device and the sound source are in direct wireless communication with each other.

16. The system of claim 15, wherein the system does not comprise an intermediary device.

17. A bone-conduction device comprising:
a dental aligner apparatus;
at least one power supply;
a transmitter;
a receiver; and
a transducer;
wherein a tungsten mass is connected to the transducer via a mass arm.

18. The bone-conduction device according to claim 17, further comprising a microphone.

19. The bone-conduction device according to claim 17, further comprising at least two processors.

20. The bone-conduction device according to claim 17, wherein the transducer vibrates in a range of from 100 to 5,500 Hertz.

* * * * *